United States Patent
Hsu (10) Patent No.: US 12,439,591 B2
(45) Date of Patent: Oct. 7, 2025

(54) MEMORY DEVICE, INTEGRATED CIRCUIT AND MANUFACTURING METHOD OF THE SAME

(71) Applicant: Ipcell Corporation Limited, Hong Kong (HK)

(72) Inventor: Te-Hsun Hsu, Hsinchu County (TW)

(73) Assignee: Ipcell Corporation Limited, Hong Kong (HK)

( * ) Notice: Subject to any disclaimer, the term of this patent is extended or adjusted under 35 U.S.C. 154(b) by 120 days.

(21) Appl. No.: 18/403,730

(22) Filed: Jan. 4, 2024

(65) Prior Publication Data
US 2024/0357805 A1  Oct. 24, 2024

(30) Foreign Application Priority Data
Apr. 21, 2023  (CN) .......................... 202310436039.7

(51) Int. Cl.
*G11C 17/00*   (2006.01)
*G11C 17/16*   (2006.01)
*G11C 17/18*   (2006.01)
*H10B 20/25*   (2023.01)

(52) U.S. Cl.
CPC ............. *H10B 20/25* (2023.02); *G11C 17/16* (2013.01); *G11C 17/18* (2013.01)

(58) Field of Classification Search
CPC ..... G11C 17/16; G11C 17/18; G11C 16/0425; G11C 16/10; G11C 17/08; G11C 17/12; G11C 17/123; G11C 17/14; G11C 17/165; G11C 29/785; G11C 5/02; G11C 5/025; G11C 5/14; G11C 7/1069; G11C 7/18; G11C 7/20; G11C 8/08; G11C 8/14; G11C 8/18; G11C 5/063; G11C 5/145; G11C 7/1066; G11C 7/1093; G11C 7/222; G11C 8/10; H10B 20/25
USPC ........... 365/189.16, 194, 203, 225.7, 230.02, 365/189.011, 230.06
See application file for complete search history.

(56) References Cited

U.S. PATENT DOCUMENTS

| | | | |
|---|---|---|---|
| 8,116,152 B2 | 2/2012 | Kaku et al. | |
| 8,847,350 B2 | 9/2014 | Lin et al. | |
| 9,984,755 B2 | 5/2018 | Jeong | |
| 2011/0235388 A1* | 9/2011 | Nakano | G11C 17/165 365/96 |

(Continued)

FOREIGN PATENT DOCUMENTS

| | | |
|---|---|---|
| CN | 103219046 A | 7/2013 |
| CN | 103680633 A | 3/2014 |

*Primary Examiner* — Thong Q Le
(74) *Attorney, Agent, or Firm* — CKC & Partners Co., LLC (57) ABSTRACT

A memory device comprises a memory cell comprising first to third transistors and a fuse element. A control terminal and a first terminal of the first transistor are coupled to a write word line and a source line respectively. The second transistor has a control terminal coupled to a second terminal of the first transistor and a first terminal coupled to a bit line. A first terminal of the fuse element is coupled to the second terminal of the first transistor and the control terminal of the second transistor. A control terminal of the third transistor is coupled to a read word line. First and second terminals of the third transistor are coupled to the source line and a second terminal of the second transistor. The first transistor is turned on to form a write path and the second and third transistors form a read path.

20 Claims, 5 Drawing Sheets

(56) References Cited

U.S. PATENT DOCUMENTS

2019/0341119 A1    11/2019   Liao et al.
2019/0341393 A1    11/2019   Peng et al.
2023/0124460 A1    4/2023   Peng et al.

\* cited by examiner

```
┌─────────────────────────────────────────────────────────┐
│  FORMING A FIRST ACTIVE REGION AND A SECOND ACTIVE      │
│  REGION SEPARATED FROM EACH OTHER ALONG A FIRST         │~51
│  DIRECTION IN A SUBSTRATE                               │
└─────────────────────────────────────────────────────────┘
                            ↓
┌─────────────────────────────────────────────────────────┐
│  FORMING A FIRST GATE STRUCTURE EXTENDING ALONG THE     │
│  FIRST DIRECTION, WHEREIN FORMING THE FIRST GATE        │
│  STRUCTURE COMPRISING: FORMING A FIRST GATE PART OF     │
│  THE FIRST GATE STRUCTURE ON A SHALLOW TRENCH           │~52
│  ISOLATION AND FORMING A SECOND GATE PART               │
│  OVERLAPPING THE FIRST GATE STRUCTURE OF THE FIRST      │
│  ACTIVE REGION IN A LAYOUT VIEW                         │
└─────────────────────────────────────────────────────────┘
                            ↓
┌─────────────────────────────────────────────────────────┐
│  FORMING A FIRST CONDUCTIVE STRUCTURE AND A SECOND      │
│  CONDUCTIVE STRUCTURE THAT CONTACT THE FIRST GATE       │
│  PART, THE FIRST CONDUCTIVE STRUCTURE COUPLED TO THE    │~53
│  SECOND ACTIVE REGION, WHEREIN AN AREA OF THE FIRST     │
│  CONDUCTIVE STRUCTURE IS LARGER THAN AN AREA OF THE     │
│  SECOND CONDUCTIVE STRUCTURE                            │
└─────────────────────────────────────────────────────────┘
```

FIG. 5

MEMORY DEVICE, INTEGRATED CIRCUIT AND MANUFACTURING METHOD OF THE SAME

CROSS-REFERENCE TO RELATED APPLICATION

This application claims priority to China Application Serial Number 202310436039.7, filed Apr. 21, 2023, which is herein incorporated by reference in its entirety.

BACKGROUND

Description of Related Art

A one-time programmable non-volatile memory can stores data continuously after the power is off because of the property of non-volatility. Such memories are broadly used in various electronic devices.

An efuse can be used to implement a one-time programmable non-volatile memory. In general, an effuse can be made by silicon or metal and operates with electron migration (EM) thereof. In some embodiments, a write path and a read path of an efuse are same. As a result, write power and electron migration in a read operation conflict with each other. For example, to lower power consumption of a memory device, the area of the effuse needed to be reduced while lowering the write power. However, such configuration makes the performance of electron migration in the read operation worse.

SUMMARY

One aspect of the present disclosure is to provide a memory device comprising a one-time programmable non-volatile memory cell that comprises a first transistor, a second transistor, a fuse element and a third transistor. A control terminal of the first transistor and a first terminal of the first transistor are coupled to a write word line and a source line respectively. The second transistor has a control terminal coupled to a second terminal of the first transistor and has a first terminal coupled to a bit line. A first terminal of the fuse element is coupled to the second terminal of the first transistor and is coupled to the control terminal of the second transistor. A control terminal of the third transistor is coupled to a read word line, a first terminal of the third transistor is coupled to the source line and a second terminal of the third transistor is coupled to a second terminal of the second transistor. The first transistor is turned on to form a write path to the fuse element, and the second transistor and the third transistor are configured as a read path.

In some embodiments, the fuse element and the second transistor share a gate structure as the first terminal of the fuse element and the control terminal of the second transistor. The gate structure receives a program voltage in a write operation.

In some embodiments, in a read operation, when the one-time programmable non-volatile memory cell stores a low logic value, the gate structure is in a floating state, and when the one-time programmable non-volatile memory cell stores a high logic value, the gate structure has a read bias.

In some embodiments, before a write operation of writing a low logic value, the first terminal of the fuse element is coupled to a program line. In the write operation of writing the low logic value, the first transistor is configured be turned on in response to the write word line having a first voltage. The fuse element is melted to be electrically disconnected with the program line in response to the program line having the first voltage.

In some embodiments, in a read operation of reading the low logic value, the control terminal of the second transistor is in a floating state.

In some embodiments, in a read operation before the write operation of writing the low logic value, the one-time programmable non-volatile memory cell stores a high logic value, and the control terminal of the second transistor has the first voltage.

In some embodiments, in a read operation and a write operation, bulk voltages of the first transistor to the third transistor are same and are a grounded voltage level, and the source line has the grounded voltage level.

In some embodiments, in the read operation, the read word line has a first voltage and the bit line has a second voltage smaller than the first voltage.

Another aspect of the present disclosure is to provide an integrated circuit comprises a first transistor, a fuse element and a second transistor. The first transistor comprises a first active area coupled to a source line and a second active area separated from the first active area in a first direction. The fuse element and the second transistor include a common gate structure extending along a second direction. The common gate structure includes a first gate portion and a second gate portion. The fuse element further comprises a first via and a second via that contact the first gate portion. The first via is coupled to a first conductive segment and the second via is coupled to the second active area through a second conductive segment. An area where the first via contacts the first gate portion is smaller than an area where the second via contacts the first gate portion.

In some embodiments, the fuse element further comprises a third via. The third via is coupled between the first conductive segment and a conductive line and receives a program voltage from the first conductive line for the fuse element. An area where the third via contacts the first conductive segment is smaller than the area where the first via contacts the first gate portion.

In some embodiments, the area where the third via contacts the first conductive segment is smaller than the area where the second via contacts the first gate portion.

In some embodiments, the fuse element further comprises: a fourth via coupled between the second conductive segment and the second active area. The area where the third via contacts the first conductive segment is smaller than an area where the fourth via contacts the second conductive segment.

In some embodiments, the fuse element further comprises a third via coupled between the second conductive segment and the second active area. The area where the first via contacts the first gate portion is smaller than an area where the third via contacts the second conductive segment.

In some embodiments, a width of the first gate portion along a second direction different from the first direction is greater than a width of the second gate portion.

In some embodiments, the integrated circuit further comprises a third transistor configured to form a read path with the second transistor and comprises a third active area coupled to the source line. The third active area is separated from the first active area along the first direction.

In some embodiments, the second transistor further comprises a fourth active area coupled to the third transistor and a fifth active area configured to receive a bit line voltage in a read operation.

Another aspect of the present disclosure is to provide a manufacturing method of integrated circuit comprising the following steps: forming a first active region and a second active region separated from each other along a first direction in a substrate; forming a first gate structure extending along the first direction, wherein forming the first gate structure comprising: forming a first gate portion of the first gate structure on a shallow trench isolation and forming a second gate portion overlapping the first gate structure of the first active region in a layout view; and forming a first conductive structure and a second conductive structure that contact the first gate portion, the first conductive structure coupled to the second active region, wherein an area of the first conductive structure is larger than an area of the second conductive structure.

In some embodiments, the manufacturing method further comprises: forming a first conductive segment that contacts the second conductive structure in a first semiconductor layer; forming a third conductive structure on the first conductive segment; and forming a conductive line that contacts the third conductive structure in a second semiconductor layer above the first semiconductor layer, wherein an area of the third conductive structure is smaller than the area of the second conductive structure.

In some embodiments, the manufacturing method further comprises: forming a fourth conductive structure on the second active region, wherein the fourth conductive structure is coupled to the first conductive structure and an area of the fourth conductive structure is greater than the area of the third conductive structure.

In some embodiments, the manufacturing method further comprises: forming a second gate structure and a third gate structure that are separated from the first gate structure along a second direction. The second gate structure overlaps the first active region in the layout view and receives a read word line voltage, and the third gate structure overlaps the second active region in the layout view and receives a write word line voltage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
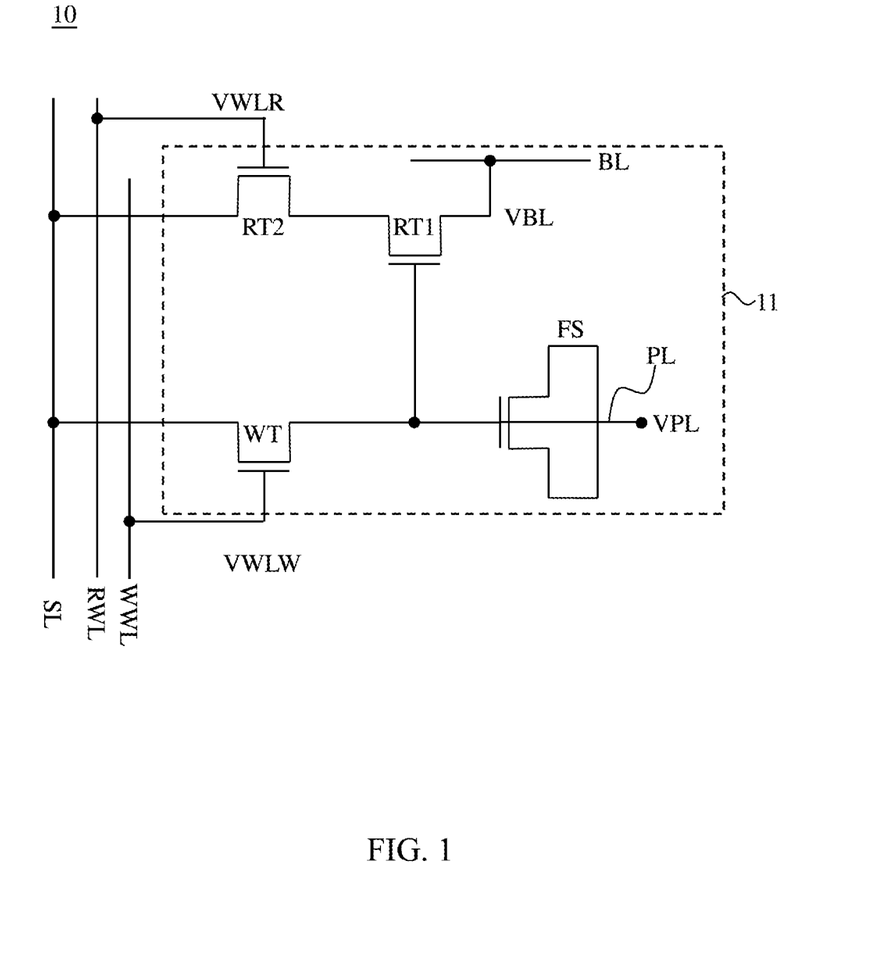
FIG. 1 depicts an example circuit diagram of a memory device in accordance with an embodiments.

Reference is now made to FIG. 1. FIG. 1 depicts an example circuit diagram of a memory device 10 in accordance with an embodiments. For illustration, the memory device 10 includes a one-time programmable non-volatile memory (OTP NVM) cell 11. An OTP NVM is used to store data in an integrated circuit and the data will not be lost when the integrated circuit is power off. In addition, a storage state of the OTP NVM is determined once a program operation to the OTP NVM is executed and the storage state of the OTP NVM cannot be changed. In some applications, the integrated circuit manufacturer stores a lot number and security information in the integrated circuit through the OTP NVM. The OPT NVM is also adopted in many other applications. In some embodiments, the OTP NVM includes an eFuse structure.

In some embodiments, the memory device 10 includes multiple OTP NVM cells 11 arranged as a memory array. A control circuit (not shown) of the memory device 10 transmits signals associated with a memory address of an OTP NVM cell to a write word line WWL or a read word line RWL to select the OTP NVM cell from the memory array and executes a corresponding write or read operation.

As shown in FIG. 1, the OTP NVM cell 11 includes a transistor WT, a transistor RT1, a transistor RT2 and a fuse element FS. In some embodiments, a write path and a read path of the OTP NVM cell 11 are separated from each other. For example, the transistor WT is configured to be turned on to form the write path to the fuse element FS, and the transistor RT1 and the transistor RT 2 are configured as the read path. In some embodiments, the transistor RT1, the transistor RT2 and the transistor WT are N type metal-oxide-semiconductor (MOS) transistor.

For illustration, a control terminal (e.g., gate terminal) of the transistor WT is coupled to the write word line WWL to receive a write word line voltage VWLW when the OTP NVM cell 11 is selected for executing a write operation. The transistor WT is regarded as a select transistor of the write operation. A source/drain terminal of the transistor WT is coupled to a source line SL and a drain/source terminal of the transistor WT is coupled to a terminal (e.g., gate terminal) of the fuse element FS and a control terminal (e.g., gate terminal) of the transistor RT1.

A drain/source terminal of the transistor RT1 is coupled to a bit line BL to receive a bit line voltage VBL, and a source/drain terminal of the transistor RT1 is coupled to a drain/source terminal of the transistor RT2. A source/drain terminal of the transistor RT2 is coupled to the source line SL to receive a source line voltage VSL. A control terminal (e.g., gate terminal) of the transistor RT2 is coupled to the read word line RWL to receive a read word line voltage VWLR when the OTP NVM cell 11 is selected for executing a read operation.

In some embodiments, the write operation changes an impedance state of the fuse element FS and further determines the storage state of the OTP NVM cell 11. For example, a program line PL coupled to a terminal of the fuse element FS applies a program voltage VPL to the fuse element FS and breaks (melts) a conductive material (e.g., metal, polysilicon, etc.) referred to as fuse link in the fuse element FS to change the resistance of the fuse element FS, which refers to as "programming" the fuse element FS. A melted position of the fuse element FS varies according to structure design of the fuse element FS. For example, some melted positions are at the gate oxide layer of the fuse elements FS, and some melted positions occur at the structures for transmitting the program voltage.

For example, when the OTP NVM cell 11 is not programmed yet, the fuse link of the fuse element FS has a storage state of low impedance in which current can be conducted through the fuse element FS. In contrast, when the OTP NVM cell 11 is programmed in the write operation, the fuse link is melted to have a storage state of high impedance. In some embodiments, when the fuse element FS has a low impedance, the corresponding storage state is a high logic state. On the contrary, when the fuse element FS has a high impedance, the corresponding storage state is a low logic state.

Figure 2A:
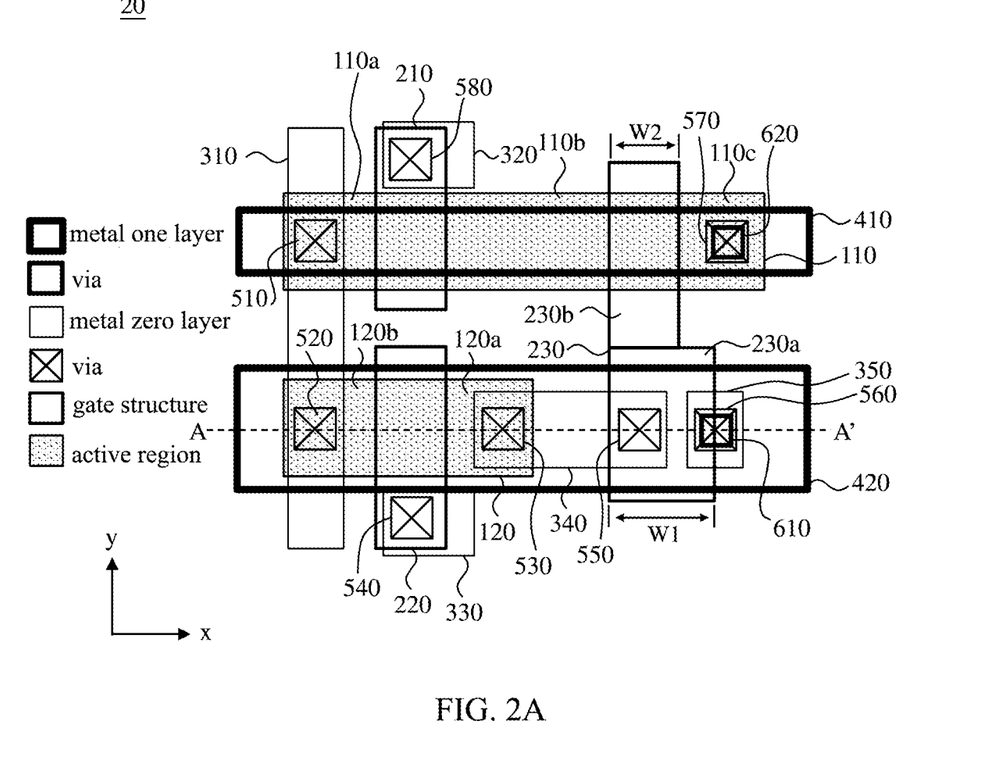
FIG. 2A depicts a schematic diagram of an integrated circuit corresponding to the memory device of FIG. 1 in a plane view in accordance with an embodiment.
Figure 2B:
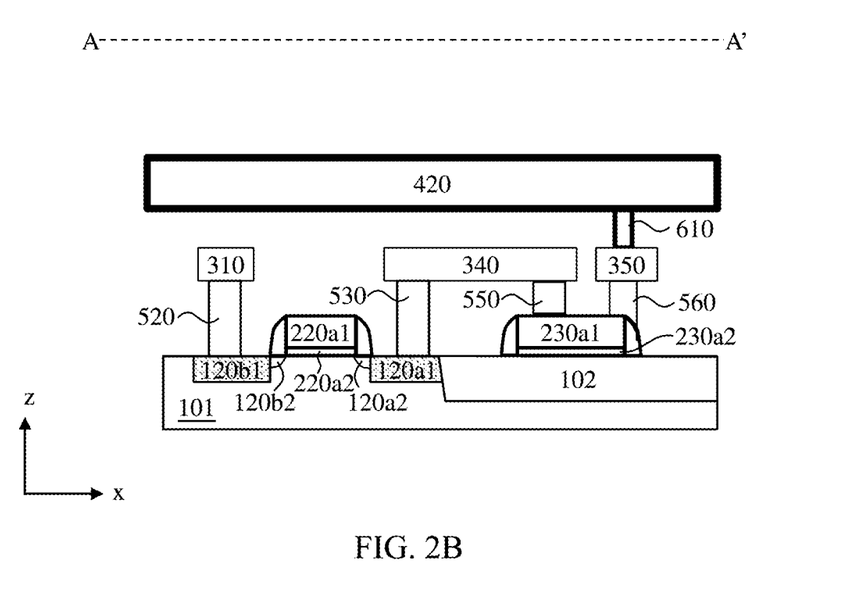
FIG. 2B depicts a schematic diagram of a portion of the integrated circuit of FIG. 2A along a line AA' in a perspective view in accordance with an embodiment.

Reference is now made to FIGS. 1, 2A and 2B to illustrate configurations and operations of the memory device 10. FIG. 2A depicts a schematic diagram of an integrated circuit 20 corresponding to the memory device of FIG. 1 in a plane view in accordance with an embodiment, and FIG. 2B depicts a schematic diagram of a portion of the integrated circuit 20 of FIG. 2A along the line AA' in a perspective view in accordance with an embodiment.

As shown in FIG. 2A, the integrated circuit 20 includes active regions 110-120, gate structures 210-230, conductive segments (metal-zero layer M0) 310-350, conductive lines (metal-one layer M1) 410-420, vias 510-580 and vias 610-620. In some embodiments, the active regions 110-120 are in a first semiconductor layer, and the gate structures 210-230 are in a second semiconductor layer above the first semiconductor layer. The conductive segments are in a third semiconductor layers above the second semiconductor layer. The vias 510-570 are conductive structures between the third semiconductor layer and the first or second semiconductor layer. The conductive line 410 is in a fourth semiconductor layer above the third semiconductor layer. The vias 610-620 are conductive structures between the third semiconductor layer and the fourth semiconductor layer.

The active region 110 includes active areas 110a-110b and the active region 120 includes active areas 120a-120b. In some embodiments, the active area 110a and the gate structure 210 correspond to the source/drain terminal and the control terminal of the transistor RT2 respectively. The active area 110b corresponds to the drain/source terminal of the transistor RT2 and the source/drain terminal of the transistor RT1. The active area 110c corresponds to the drain/source terminal of the transistor RT1. The active area 120a corresponds to the drain/source terminal of the transistor WT and the active area 120b corresponds to the source/drain terminal of the transistor WT. The gate structure 220 corresponds to the control terminal of the transistor WT. The gate structure 230 (referred to as a common gate structure) is shared by the transistor RT1 and the fuse element FS and corresponds to the control terminal of the transistor RT1 and a terminal of the fuse element FS.

The active region 110 and the active region 120 extend along a x direction and separated from each other along a y direction. The gate structures 210-230 extend along the y direction. The gate structure 230 is separated from the gate structures 210-220 along the x direction, in which the gate structure 210 is separated from the gate structure 220 along the y direction. The gate structure 230 includes a gate portion 230a and a gate portion 230b. As shown in FIG. 2, the gate structure 210 and the gate portion 230b overlap the active region 110 in a layout view, and the gate structure 220 overlap the active region 120. In the embodiments shown in FIG. 2A, along the x direction, the width W1 of the gate portion 230a is different from the width W2 of the gate portion 230b. In some embodiments, the width W1 is greater than the width W2.

The conductive segment 310 extends along the y direction and is coupled to the active area 110a and the active area 120b through the via 510 and the via 520 respectively. The conductive segment 310 is configured to transmit the source line voltage VSL on the source line SL to the active area 110a and the active area 120b.

The conductive segments 320-350 extend along the x direction. The conductive segment 320 is coupled to the gate structure 210 to transmit the read word line voltage VWLR to the gate structure 210. The conductive segment 330 is coupled to the gate structure 220 through the via 540 to transmit the write word line voltage VWLW to the gate structure 220. The conductive segment 340 is coupled to the active area 120a and the gate portion 230a through the via 530 and the via 550 respectively. The conductive segment 350 is coupled between the via 560 and the via 610 and the via 610 is further coupled to the conductive line 420.

The conductive line 410 and the conductive line 420 extend along the x direction. The conductive line 410 is configured to transmit the bit line voltage VBL to the active area 110c through the vias 570 and 620 that are coupled to each other. In some embodiments, the conductive line 420 is coupled to the gate portion 230a through the via 610, the conductive segment 350 and the via 560 to transmit the program voltage VPL.

Reference is made to FIG. 2B. The active area 120a is formed in a substrate 101 and includes a doped region 120a1 and low doped region 120a2. Similarly, the active area 120b is formed in the substrate 101 and includes a doped region 120b1 and low doped region 120b2. The gate structure 220 includes a gate electrode 220a1, a gate oxide layer 220a2 and spacers at the both sides. Similarly, the gate portion 230a includes a gate electrode 230a1, a gate oxide layer 230a2 and spacers at the both sides. In some embodiments, the gate portions 230a-230b have same configurations. The gate portion 230a is located on a shallow trench isolation (STI) 102.

Reference is now made to both FIG. 2A and FIG. 2B. In some embodiments, the fuse element FS at least includes the vias 530, 550, 560, 610, the gate portion 230a and the conductive segments 340, 350. In some embodiments, in the layout view, the area of the via 560 is smaller than the areas of the vias 550 and 530. For example, the area where the via 560 contacts the gate portion 230a or/and the area where the via 560 contacts the conductive segment 350 are smaller than the area where the via 550 contacts the gate portion 230a or/and the area where the via 550 contacts the conductive segment 340, and smaller than the area where the via 530 contacts conductive segment 340 or/and the area where the via 530 contacts the active area 120a. In addition, in some embodiments, in the layout view, the area of the via 610 is smaller than the area of the via 560. For example, the area where the via 610 contacts the conductive segment 350 or/and the conductive line 420 is smaller than the area where the via 560 contacts the conductive segment 350. In other words, the area where the via 610 contacts the conductive segment 350 or/and conductive line 420 is also smaller than the area where the via 550 contacts the gate portion 230a and the area where the via 530 contacts the conductive segment 340 or/and the active area 120a. With the above configurations, in some embodiments, during the write operation, the melting of the fuse element FS can occur at the via 610, the via 560, between the via 560 and the gate portion 230a, the gate oxide layer 230a2, one of the above or combinations thereof.

Reference is now made to FIG. 1, FIG. 2A and FIG. 2B to illustrate the write operation and the read operation. In some embodiments, voltages for executing the write operation and the read operation are shown in the following table 1:

TABLE 1 voltages for executing the write operation and the read operation

| | VWLW | VPL | VWLR | VBL | VSL | Vbulk |
|---|---|---|---|---|---|---|
| WRITE | V1 | V1 | 0 | 0 | 0 | 0 |
| READ | 0 | V1 | V1 | V2 | 0 | 0 |

In the table 1, the bulk voltage Vbulk is the body voltage (also referred to as the voltage applied to the substrate 101) of the transistor RT1, the transistor RT2 and the transistor WT. In some embodiments, the voltage V1 is different from the voltage V2. For example, the voltage V1 is greater than the voltage V2. In some operations, the voltage V1 is about 1.6 volts and the voltage V2 is about 0.8 volts.

According to the table 1, during the write operation, the write word line voltage VWLW is the voltage V1 to turn on the transistor WT to form the write path from the program line PL to the source line SL and direct the program voltage VPL being the voltage V1 on the program line PL to the fuse element FS to melt the fuse link of the fuse element FS. During the write operation, the read word line voltage VWLR, the bit line voltage VBL, the source line voltage VSL and the bulk voltage Vbulk have ground voltage level (e.g., 0 volts).

For example, before the write operation of writing a low logic value (e.g., logic zero), the fuse element FS has the low impedance corresponding to storing high logic (e.g., logic one) state. In other words, a terminal of the fuse element FS is coupled to the program line PL through the via 560, the conductive segment 350, the via 610 and the conductive line 420. Then, in the write operation, the transistor WT is turned on in response to the write word line voltage, the gate portion 230a of the fuse element FS receives the program voltage VPL and, in response to the program voltage VPL, the fuse element FS is melted to be electrically disconnected with the conductive line 420 that corresponds to the program line PL. As a result, the fuse element FS becomes to have the high impedance corresponding to storing the low logic state.

In the read operation, the read word line voltage VWLR is the voltage V1 to turn on the transistor RT2. The bit line voltage VBL is the voltage V2. The write word line voltage VWLW, source line voltage VSL and the bulk voltage Vbulk have ground voltage level. Under such configurations, the voltage level of the control terminal of the transistor RT1 is associated with the voltage level of the terminal of the fuse element FS.

For example, when executing the read operation to the OTP NVM cell 11 that is turned into storing the low logic value in the above embodiment, the gate portion 230a is floating since the gate portion 230a has been electrically disconnected with the program line PL. In other words, in the read operation of reading the low logic value, the control terminal of the transistor RT1 is floating and that makes the transistor RT1 be turned off. Then, a sense circuit connected to the bit line BL determines the storage state of the fuse element FS as the low logic value according to the current in the bit line BL.

In contrast, when the fuse link of the fuse element FS is not melted (i.e., the fuse element FS has the low impedance corresponding to the high logic value), the program line PL and the gate portion 230a are conducting and that makes the voltage level of the control terminal of the transistor RT1 be the read bias associated with the program voltage VPL. In some embodiments, the read bias is smaller than the program voltage VPL. In this way, the transistor RT1 and the transistor RT2 are turned on to make the bit line BL and the source line SL being conducting and that causes the sense circuit connected to the bit line BL determines the storage state of the fuse element FS as a high logic value according to the current on the bit line BL.

It should be noted that the voltages in the table 1 are given for illustrative purposes. Various implements are within the contemplated scope of the present disclosure. For example, in the write operation, the write word line voltage VWLW can be different from the voltage V1. The write word line voltage VWLW can be every possible voltage for turning on the transistor WT to form the write path from the program line PL to the source line SL in the write operation. Similarly, the read word line voltage VWLR can be every possible voltage for turning on the transistor RT2 to form the read path from the bit line BL to the source line SL in the read operation.

Figure 3A:
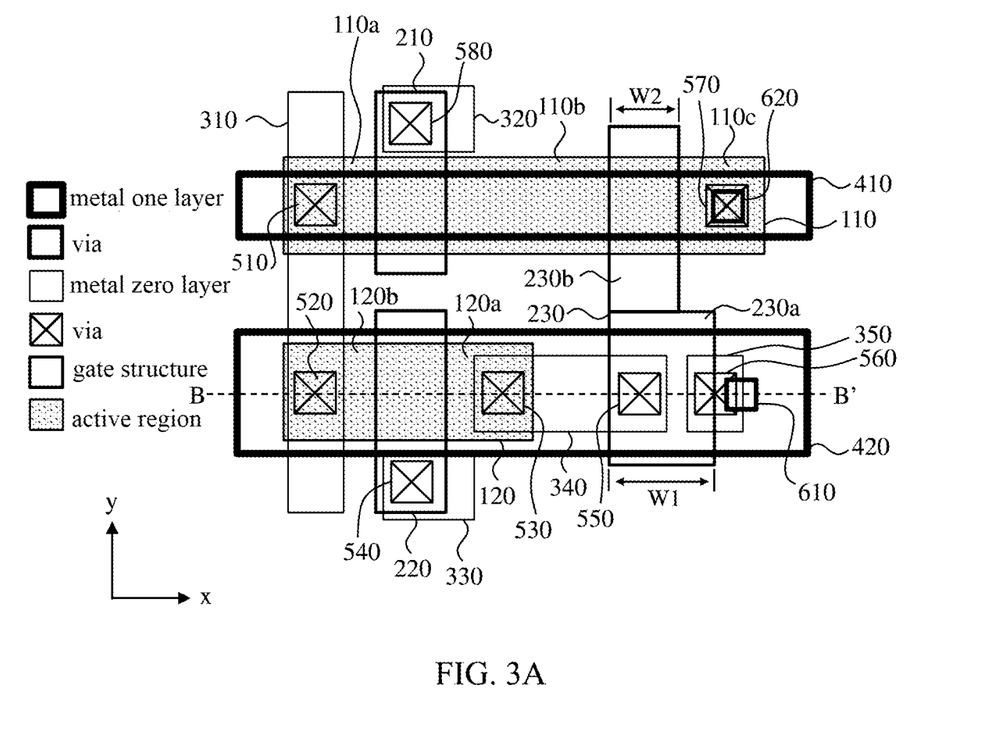
FIG. 3A depicts a schematic diagram of an integrated circuit corresponding to the memory device of FIG. 1 in the plane view in accordance with an embodiment.
Figure 3B:
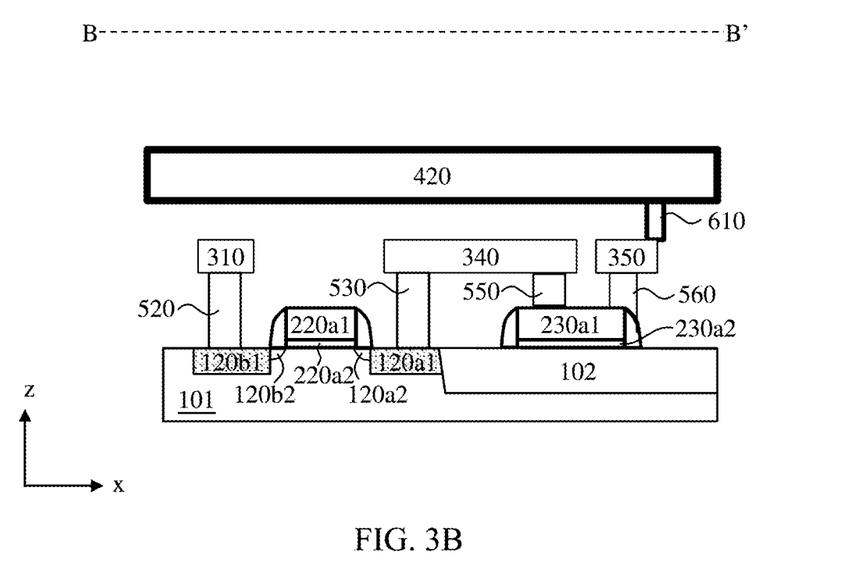
FIG. 3B depicts a schematic diagram of a portion of the integrated circuit along a line BB' in the perspective view in accordance with an embodiment.

Reference is now made to FIG. 3A to FIG. 3B. FIG. 3A depicts a schematic diagram of an integrated circuit 30 corresponding to the memory device 10 of FIG. 1 in the plane view in accordance with an embodiment. FIG. 3B depicts a schematic diagram of a portion of the integrated circuit 30 along a line BB' in the perspective view in accordance with an embodiment.

Compared with the embodiments of FIG. 2A and FIG. 2B, the via 610 and the via 560 are not align with each other in FIG. 3A to FIG. 3B, and the via 610 and the conductive segment 350 partially overlap each other in the layout view of FIG. 3A.

Figure 4:
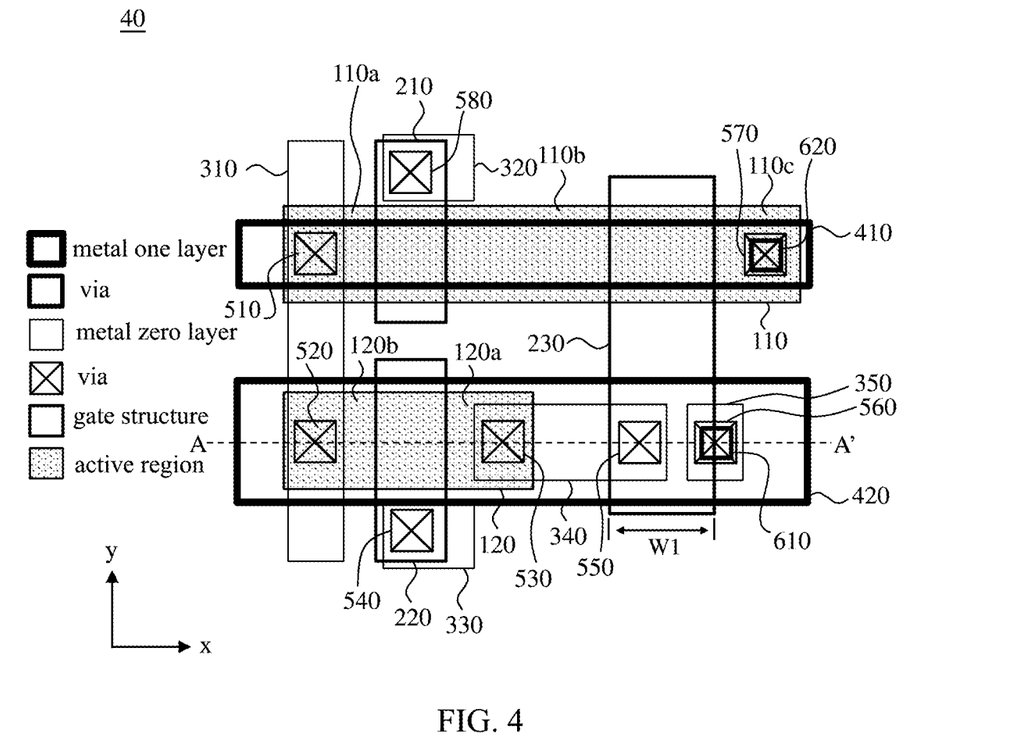
FIG. 4 depicts a schematic diagram of an integrated circuit corresponding to the memory device of FIG. 1 in the plane view in accordance with an embodiment.

Reference is now made to FIG. 4. FIG. 4 depicts a schematic diagram of an integrated circuit 40 corresponding to the memory device 10 of FIG. 1 in the plane view in accordance with an embodiment.

Compared with the embodiments of FIG. 2A to FIG. 2B, instead of the gate structure 230 having two gate portions 230a and 230b that have different widths along the x direction, the gate structure 230 extends along the x direction and has an uniform width (e.g., the width W1) in the embodiment of FIG. 4.

The configurations of FIG. 1 to FIG. 3B are given for illustrative purposes. Various implements of FIG. 1 to FIG. 3B are within the contemplated scope of an embodiment of the present disclosure. For example, in some embodiments, the gate structure 230 included in the embodiments depicted in FIG. 3A to FIG. 3B has a uniform width as depicted in the embodiment of FIG. 4.

Figure 5:
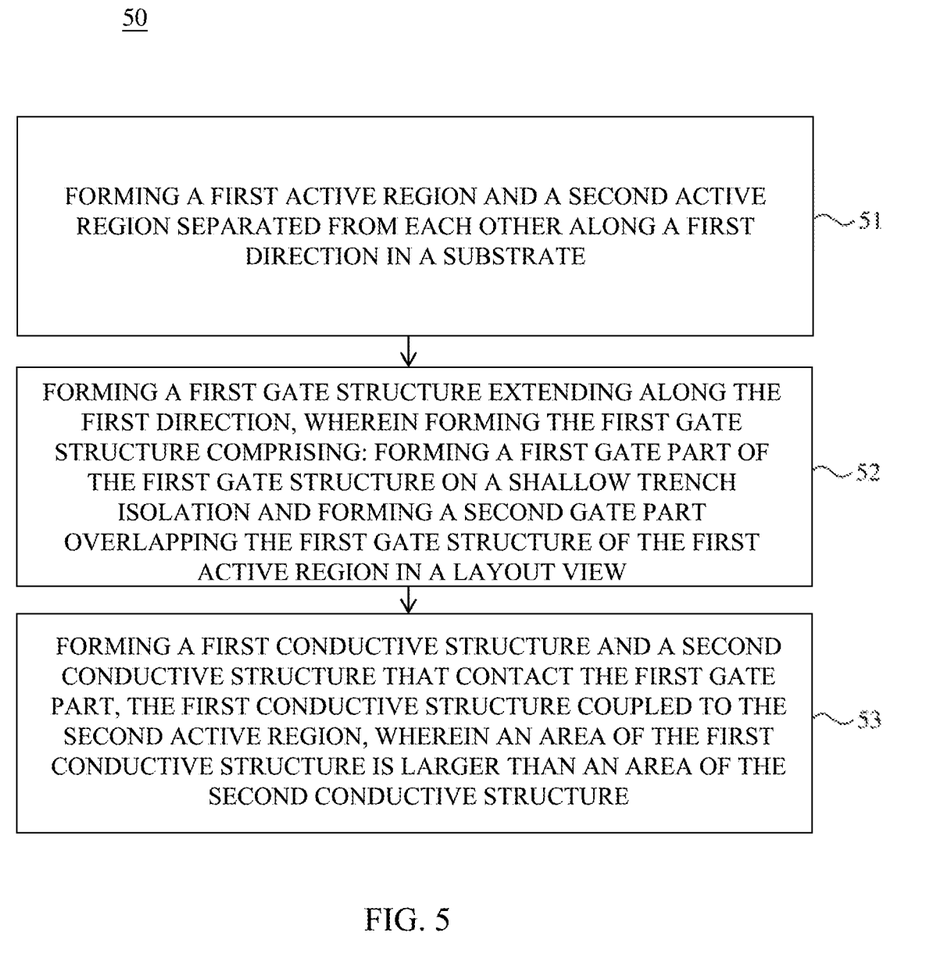
FIG. 5 depicts a flowchart of a manufacturing method of integrated circuit.

Reference is now made to FIG. 5. FIG. 5 depicts a flowchart of a manufacturing method 50 of integrated circuit. It is understood that additional operations can be provided before, during, and after the processes shown by FIG. 5, and some of the operations described below can be replaced or eliminated, for additional embodiments of the method 50. The method 50 includes operations 51-53 described with reference to FIG. 5. The manufacturing method 50 of integrated circuit would be discussed below in coordination with the embodiments of FIG. 1 to FIG. 4.

In operation 51, as shown in FIG. 2A and FIG. 2B, the active region 110 and the active region 120 separating from each other along the y direction are formed in the substrate 101.

In operation 52, the gate structure 230 extending along the y direction is formed. In some embodiments, forming the gate structure 230 includes forming the gate portion 230a of the gate structure 230 on the STI 102 and forming the gate portion 230b of the gate structure 230 overlapped with the active region 110 in the layout view.

In operation 53, the via 550 and the via 560 contacting the gate portion 230a are formed, in which the area of the via 550 is greater than the area of the via 560.

In some embodiments, the manufacturing method 50 of integrated circuit further includes the following operations: like the integrated circuits 20-40 of FIG. 2A to FIG. 4, forming the segment 350 that contacts the via 560 in a first semiconductor layer (e.g., the metal zero layer); forming the via 610 on the conductive segment 350; and forming the conductive line 420 that contacts the via 610 in a second semiconductor layer (e.g., the metal one layer). The area of the via 610 is smaller than the area of the via 560.

In the previous embodiment, the manufacturing method 50 of integrated circuit further includes the following operations: forming the via 530 on the active region 120. The via 530 is coupled to the via 550, and the area of the via 530 is greater than the area of the via 610. In some embodiments, as shown in FIG. 3A to FIG. 3B, the via 610 partially overlaps the conductive segment 350 in the layout view.

In some embodiments, the manufacturing method 50 of integrated circuit further comprises the following operations: forming the gate structure 210 and the gate structure 220 that are separated from the gate structure 230 along the x direction. The gate structure 210 overlaps the active region 110 in the layout view and receive the read word line voltage VWLR. The gate structure 220 overlaps the active region 120 in the layout view and receive the write word line voltage VWLW.

In summary, the memory device, the integrated circuit and manufacturing method thereof in the present disclosure provide an OTP NVM cell with the read path and the write path separated from each other. With such configuration, the problems caused by the conflict between electro migration in the read operation and write power are avoided. As a result, write power is lowered while maintaining good electro migration in read operation. Lowering power consumption of the memory device further improves the performance of the product.

While the disclosure has been described by way of example(s) and in terms of the preferred embodiment(s), it is to be understood that the disclosure is not limited thereto. Those skilled in the art may make various changes, substitutions, and alterations herein without deportioning from the spirit and scope of the present disclosure. In view of the foregoing, it is intended that the present invention cover modifications and variations of this invention provided they fall within the scope of the following claims.

What is claimed is:

1. A memory device comprising a one-time programmable non-volatile memory cell that comprises:
    a first transistor, a control terminal of the first transistor and a first terminal of the first transistor coupled to a write word line and a source line respectively;
    a second transistor that has a control terminal coupled to a second terminal of the first transistor and has a first terminal coupled to a bit line;
    a fuse element, wherein a first terminal of the fuse element is coupled to the second terminal of the first transistor and the control terminal of the second transistor; and
    a third transistor, wherein a control terminal of the third transistor is coupled to a read word line, a first terminal of the third transistor is coupled to the source line and a second terminal of the third transistor is coupled to a second terminal of the second transistor,
    wherein the first transistor is configured to be turned on to form a write path to the fuse element, and the second transistor and the third transistor are configured as a read path.

2. The memory device of claim 1, wherein the fuse element and the second transistor share a gate structure as the first terminal of the fuse element and the control terminal of the second transistor,
    wherein the gate structure is configured to receive a program voltage in a write operation.

3. The memory device of claim 2, wherein in a read operation, when the one-time programmable non-volatile memory cell stores a low logic value, the gate structure is in a floating state, and
    when the one-time programmable non-volatile memory cell stores a high logic value, the gate structure has a read bias.

4. The memory device of claim 1, wherein before a write operation of writing a low logic value, the first terminal of the fuse element is coupled to a program line,
    wherein in the write operation of writing the low logic value, the first transistor is configured be turned on in response to the write word line having a first voltage, and the fuse element is configured to be melted, in response to the program line having the first voltage, to be electrically disconnected with the program line.

5. The memory device of claim 4, wherein in a read operation of reading the low logic value, the control terminal of the second transistor is in a floating state.

6. The memory device of claim 4, wherein in a read operation before the write operation of writing the low logic value, the one-time programmable non-volatile memory cell stores a high logic value and the control terminal of the second transistor has the first voltage.

7. The memory device of claim 1, wherein in a read operation and a write operation, bulk voltages of the first transistor to the third transistor are the same and are a grounded voltage level, and the source line has the grounded voltage level.

8. The memory device of claim 7, wherein in the read operation, the read word line has a first voltage and the bit line has a second voltage smaller than the first voltage.

9. An integrated circuit comprising:
a first transistor comprising a first active area coupled to a source line and a second active area separated from the first active area in a first direction; and
a fuse element and a second transistor that comprise a common gate structure extending along a second direction, wherein the common gate structure includes a first gate portion and a second gate portion,
wherein the fuse element further comprises a first via and a second via that contact the first gate portion, wherein the first via is coupled to a first conductive segment and the second via is coupled to the second active area through a second conductive segment, wherein an area where the first via contacts the first gate portion is smaller than an area where the second via contacts the first gate portion.

10. The integrated circuit of claim 9, wherein the fuse element further comprises:
a third via coupled between the first conductive segment and a conductive line and configured to receive a program voltage from the first conductive line for the fuse element,
wherein an area where the third via contacts the first conductive segment is smaller than the area where the first via contacts the first gate portion.

11. The integrated circuit of claim 10, wherein the area where the third via contacts the first conductive segment is smaller than the area where the second via contacts the first gate portion.

12. The integrated circuit of claim 11, wherein the fuse element further comprises:
a fourth via coupled between the second conductive segment and the second active area, wherein the area where the third via contacts the first conductive segment is smaller than an area where the fourth via contacts the second conductive segment.

13. The integrated circuit of claim 9, wherein the fuse element further comprises:
a third via coupled between the second conductive segment and the second active area, wherein the area where the first via contacts the first gate portion is smaller than an area where the third via contacts the second conductive segment.

14. The integrated circuit of claim 9, wherein a width of the first gate portion along a second direction different from the first direction is greater than a width of the second gate portion.

15. The integrated circuit of claim 9, further comprising:
a third transistor configured to form a read path with the second transistor and comprising a third active area coupled to the source line, wherein the third active area is separated from the first active area along the first direction.

16. The integrated circuit of claim 15, wherein the second transistor further comprises:
a fourth active area coupled to the third transistor; and
a fifth active area configured to receive a bit line voltage in a read operation.

17. A manufacturing method of integrated circuit comprising the following steps:
forming a first active region and a second active region that are separated from each other along a first direction in a substrate;
forming a first gate structure extending along the first direction, wherein forming the first gate structure comprising:
forming a first gate portion of the first gate structure on a shallow trench isolation and forming a second gate portion overlapping the first gate structure of the first active region in a layout view; and
forming a first conductive structure and a second conductive structure that contact the first gate portion, the first conductive structure coupled to the second active region, wherein an area of the first conductive structure is larger than an area of the second conductive structure.

18. The manufacturing method of claim 17, further comprising:
forming a first conductive segment that contacts the second conductive structure in a first semiconductor layer;
forming a third conductive structure on the first conductive segment; and
forming a conductive line that contacts the third conductive structure in a second semiconductor layer above the first semiconductor layer, wherein an area of the third conductive structure is smaller than the area of the second conductive structure.

19. The manufacturing method of claim 18, further comprising:
forming a fourth conductive structure on the second active region, wherein the fourth conductive structure is coupled to the first conductive structure and an area of the fourth conductive structure is greater than the area of the third conductive structure,
wherein the third conductive structure partially overlaps the first conductive segment in the layout view.

20. The manufacturing method of claim 17, further comprising:
forming a second gate structure and a third gate structure that are separated from the first gate structure along a second direction,
wherein the second gate structure overlaps the first active region in the layout view and receives a read word line voltage, and
the third gate structure overlaps the second active region in the layout view and receives a write word line voltage.

* * * * *